US012698646B2

(12) United States Patent
Hall

(10) Patent No.: US 12,698,646 B2
(45) Date of Patent: Aug. 4, 2026

(54) LOCK

(71) Applicant: Kingsway Enterprises (UK) Limited, Sidcup (GB)

(72) Inventor: Benjamin Hall, Swanley (GB)

(73) Assignee: Kingsway Enterprises (UK) Limited, Kent (GB)

( * ) Notice: Subject to any disclaimer, the term of this patent is extended or adjusted under 35 U.S.C. 154(b) by 106 days.

(21) Appl. No.: 18/284,258

(22) PCT Filed: Apr. 26, 2022

(86) PCT No.: PCT/GB2022/051053

§ 371 (c)(1),
(2) Date: Sep. 26, 2023

(87) PCT Pub. No.: WO2022/229624

PCT Pub. Date: Nov. 3, 2022

(65) Prior Publication Data

US 2024/0159084 A1 May 16, 2024

(30) Foreign Application Priority Data

Apr. 29, 2021 (GB) ..................................... 2106183

(51) Int. Cl.
*E05B 15/10* (2006.01)
*E05B 13/00* (2006.01)
(Continued)

(52) U.S. Cl.
CPC ............ *E05B 15/10* (2013.01); *E05B 13/005* (2013.01); *E05B 15/0013* (2013.01);
(Continued)

(58) Field of Classification Search
CPC ............... E05B 13/005; E05B 15/0013; E05B 15/0033; E05B 15/04; E05B 15/10;
(Continued)

(56) References Cited

U.S. PATENT DOCUMENTS 266,947 A 10/1882 Zerfas
609,422 A 8/1898 Fackner
(Continued)

FOREIGN PATENT DOCUMENTS

| | | | | |
|---|---|---|---|---|
| FR | 2345575 A1 | 10/1977 | | |
| GB | 2215391 A | 9/1989 | | |
| WO | WO-2004040086 A1 * | 5/2004 | ............. | E05B 59/00 |

OTHER PUBLICATIONS

GB Patent Application No. 2106183.3 Combined Search and Examination Report dated Jan. 14, 2022.
(Continued)

*Primary Examiner* — Christopher J Boswell
(74) *Attorney, Agent, or Firm* — Erise IP, P.A.

(57) ABSTRACT

A lock for installation in a door leaf defining a first plane, the lock comprising: a housing; and a bolt moveable relative to the housing between a retracted position, and an extended position in which a distal portion of the bolt protrudes from an opening in the shoulder sloped in a plane parallel to the first plane, such that the bolt housing; wherein the distal portion of the bolt comprises at least one is moveable into the retracted position in response to a force applied to the shoulder.

17 Claims, 8 Drawing Sheets

(51) Int. Cl.
*E05B 15/00* (2006.01)
*E05B 15/04* (2006.01)
*E05B 59/00* (2006.01)
*E05B 63/00* (2006.01)
*E05B 63/08* (2006.01)
*E05B 63/18* (2006.01)
*E05B 65/00* (2006.01)

(52) U.S. Cl.
CPC .......... *E05B 15/0033* (2013.01); *E05B 15/04* (2013.01); *E05B 59/00* (2013.01); *E05B 63/0017* (2013.01); *E05B 63/08* (2013.01); *E05B 63/185* (2013.01); *E05B 65/00* (2013.01); *E05B 2015/0413* (2013.01); *E05B 65/0017* (2013.01)

(58) Field of Classification Search
CPC ............. E05B 2015/0413; E05B 59/00; E05B 63/0017; E05B 63/08; E05B 63/16; E05B 63/18; E05B 63/185
See application file for complete search history.

(56) References Cited

U.S. PATENT DOCUMENTS

| | | | | | |
|---|---|---|---|---|---|
| 1,434,370 | A | 11/1922 | Crompton et al. | | |
| 1,968,285 | A | 7/1934 | Egan | | |
| 2,581,606 | A | 1/1952 | Seaman et al. | | |
| 2,786,706 | A | 3/1957 | Wright | | |
| 3,193,315 | A * | 7/1965 | James | E05B 13/005 | 292/169.21 |
| 3,789,633 | A * | 2/1974 | Crepinsek | E05B 65/1086 | 70/110 |
| 5,678,870 | A * | 10/1997 | Pelletier | E05B 55/12 | 292/169.16 |
| 5,878,612 | A * | 3/1999 | Mauer | E05B 47/0002 | 70/277 |
| 6,993,946 | B1 * | 2/2006 | Shen | E05B 55/12 | 292/169.22 |
| 7,188,870 | B2 * | 3/2007 | Huang | E05B 15/10 | 70/462 |
| 8,292,336 | B2 * | 10/2012 | Moon | E05B 63/04 | 70/462 |
| 8,347,668 | B2 * | 1/2013 | Min | E05B 59/00 | 292/336.5 |
| 8,419,084 | B2 * | 4/2013 | Ding | E05B 47/0012 | 292/144 |
| 8,534,723 | B2 * | 9/2013 | Berger | E05B 13/005 | 292/336.3 |
| 11,486,165 | B2 * | 11/2022 | Tsai | E05B 9/04 | |
| 11,572,722 | B2 * | 2/2023 | Uyeda | E05C 1/002 | |
| 11,585,118 | B2 * | 2/2023 | Lin | E05B 63/08 | |
| 11,598,131 | B2 * | 3/2023 | Romero | E05B 55/12 | |
| 11,887,425 | B2 * | 1/2024 | Chen | G07C 9/20 | |
| 2011/0120024 | A1 | 5/2011 | Shilts | | |
| 2011/0174026 | A1 | 7/2011 | Salvatore et al. | | |
| 2014/0333073 | A1 * | 11/2014 | Bartos | E05B 47/0673 | 292/32 |

OTHER PUBLICATIONS

PCT Patent Application No. PCT/GB2022/051053 International Search Report and Written Opinion dated Oct. 31, 2022.
PCT Patent Application No. PCT/GB2022/051053 International Preliminary Report on Patentability dated Aug. 1, 2023.

* cited by examiner

LOCK

RELATED APPLICATION

The present application is a national stage application under 35 U.S.C. § 371 of International Application No. PCT/GB2022/051053, filed 26 Apr. 2022, which claims priority from Great Britain Patent Application No. 2106183.3, filed 29 Apr. 2021. The above-referenced applications are incorporated by reference.

FIELD

The present disclosure relates to a lock for a door, and in particular to locks for doors in prisons and psychiatric hospitals.

BACKGROUND

Locks for doors are widely used to ensure privacy and security. Broadly speaking, most door locks have a housing, a lock mechanism (for example, a keyed lock cylinder or thumb turn), and a bolt. A user can operate the lock mechanism which in turn moves the bolt between a locked (extended) position and an unlocked (retracted) position.

When fitted to a door that has a door leaf and a door frame, a lock as described above enables the door to be locked thus providing privacy and/or security. When locked, the bolt is received by a socket in the door frame, thus substantially preventing movement of the door leaf relative to the door frame.

The primary aim of a lock is to provide security. In order to achieve security, locks are designed to prevent the bolt from moving into the unlocked position (other than by the intended mechanism, e.g. by use of a key). Moreover, locks are designed with redundancies and backup features, all of which are specifically configured to prevent unwanted retraction of the bolt into the housing.

In psychiatric hospitals and prisons, a problem exists that patients may wish to cause themselves harm by anchoring a ligature around an available anchor point in a room. The same problem may arise in facilities other than psychiatric hospitals or prisons.

When a door having a lock as described above is locked, the bolt provides a potential anchor point around which an individual may try to secure a ligature to cause themselves harm. In particular, an individual may pass a ligature (for example, a charging cable) between a gap between the door frame and the door leaf, and around the bolt. Because the bolt is received in the socket of the door frame, it provides a very stable anchor point. In short, a problem with existing locks is that a ligature can be anchored around the bolt, thus enabling someone to cause themselves harm.

Additionally, in lower security psychiatric environments, a handle for operating the lock may be provided both on the inside of the door and on the outside of the door, such that the inhabitant of a room can open the door from the inside. However, the ability for the inhabitant of the room to control the lock gives rise to a further problem. In particular, the inhabitant may apply a force to the inside door handle, thereby preventing the door from being opened from the outside. As a result, medical personnel may not be able to access the room when the patient is in danger or attempting to cause themselves harm.

SUMMARY

In a first aspect there is provided a lock for installation in a door leaf defining a first plane, the lock comprising:

a housing; and a bolt moveable relative to the housing between a retracted position, and an extended position in which a distal portion of the bolt protrudes from an opening in the housing;

wherein the distal portion of the bolt comprises at least one shoulder sloped in a plane parallel to the first plane, such that the bolt is moveable into the retracted position in response to a force applied to the shoulder.

For example, where the lock is installed in a vertically oriented door leaf, the at least one shoulder may comprise an upper sloped shoulder and/or a lower sloped shoulder, for example an upper sloped shoulder and a lower sloped shoulder.

By providing a shoulder that is sloped in a plane parallel to the first plane on the distal end of the bolt, a force applied to the distal end of the bolt in a direction parallel to the first plane will cause the bolt to move from the extended position to the retracted position—even if the force is applied in a direction perpendicular to the direction of movement of the bolt relative to the housing. Accordingly, whenever an individual tries to anchor a ligature around the distal portion of the bolt, the force applied to the distal portion of bolt by the ligature will cause the bolt to retract into the housing. For example, where the lock is installed in a vertically oriented door leaf, and a ligature is secured around the distal end of the bolt so as to apply a vertical (e.g. upwards or downwards) force to the distal end of the bolt, the slope of the at least one shoulder will cause the force to move the bolt into the retracted position. Accordingly, the anchor point is removed. This improves safety, by helping to prevent self-harm attempts.

The bolt may be moveable relative to the housing between the retracted and extended positions in a first (e.g. horizontal) direction parallel to the first plane, and the slope of the shoulder may be such that the bolt is moveable into the retracted position in response to a force being applied to the shoulder in a second (e.g. vertical) direction that is perpendicular to the first direction and parallel with the first plane. That is, the slope of the at least one shoulder may form an oblique angle with the first direction. As a result, when a force is applied to the sloped shoulder in the second direction, the resultant force on the bolt will include both a vertical component and a horizontal component. The horizontal component will thus drive retraction of the bolt.

The lock may be for installation in a door leaf that opens and closes in a third direction that's perpendicular to the first and second directions. The sloped at least one shoulder may form an oblique angle with each of the first and second directions, and may be perpendicular to the third direction.

In some examples, the distal portion of the bolt may further be rounded in a plane defined parallel with the first and third directions. That is, the surfaces of the bolt parallel with the first plane may also be rounded at the distal end of the bolt. This may further help with retraction of the bolt when a force as described above is applied to it.

When the bolt is in the (fully) extended position, the slope of the at least one shoulder may extend at least to the opening. For example, the slope of the at least one shoulder may extend from the opening to a distal-most point of the bolt. The travel of the bolt in the distal direction may be limited to ensure that the slope of the shoulder coincides with the opening when the bolt is fully extended. The travel may be limited by at least one detent provided on an inner surface of the housing, the at least one detent configured to engage a corresponding surface of the bolt in the extended position. The slope of the at least one shoulder may in some examples also extend proximally from the opening when the bolt is in the extended position (for example, extend from within the housing to the distal-most point of the bolt).

The at least one shoulder may comprise a first (e.g. upper) shoulder and a second (e.g. lower) shoulder opposing the first shoulder.

The distal portion of the bolt may be rounded to form the at least one shoulder (e.g. rounded to form the first and second opposing shoulders).

The bolt may be resiliently biased into the extended position. This may be achieved by a spring, for example a helical spring or a leaf spring, coupled to the housing and to the bolt.

The lock may comprise a lock mechanism configured to engage the bolt and operable to selectively retain the bolt in the retracted position. The lock mechanism may comprise a locked configuration in which it engages the bolt and retains the bolt in the retracted position; and an unlocked configuration in which it is disengaged from the bolt such that the bolt is resiliently biased into the extended position.

The lock mechanism may comprise a follower, the follower including a cam configured to engage a corresponding surface on the bolt. The follower may be rotatable between a first rotational position in which the cam is disengaged from the bolt such that the bolt is resiliently biased into the extended position (e.g. the locked configuration of the lock mechanism); and a second rotational position in which the cam engages the corresponding surface on the bolt to retain the bolt in the retracted position (e.g. the unlocked configuration of the lock mechanism). The bolt may be moveable relative to the follower when the follower is in the unlocked position. The follower may be operable via a spindle, examples of which are provided below.

The lock may further comprise a shroud arranged within the housing to conceal an interior of the housing when the bolt is in the retracted position. The shroud may extend proximally from the opening. The shroud may at least partially encase the bolt within the housing.

In a second aspect there is provided a lock for a door, the lock comprising:

- a bolt, a follower configured to operate the bolt, and a first spindle extending from a first side of the lock;
- wherein the first spindle is translatable relative to the follower between a first position in which the first spindle is rotationally coupled with the follower; and a second position in which the first spindle is rotationally decoupled from the follower.

The first spindle may be for attachment to a first handle on the first side of the lock, such that rotation of the follower can be operated by a first user via the first spindle. Because the first spindle is translatable into a second position in which it is decoupled from the follower, a second user can prevent the first user from jamming the lock by moving the first spindle into the second position. Accordingly, where the lock according to the second aspect is coupled to a door, the second user can prevent the first user from jamming the lock in order to gain access.

The lock may be for installation in a door leaf defining a first plane. The first spindle may be translatable in a direction perpendicular to the first plane.

The first spindle may be translatable into the second position via a second side of the lock opposing the first side of the lock. In some examples, the first spindle may only be translatable into the second position via the second side of the lock. That is, translation of the spindle may not be operable from the first side of the lock. For example, the first handle may be rotationally coupled with the first spindle and translationally decoupled/disengaged from the first spindle. The second side of the lock may comprise a push-button or pull-tab for translating the first spindle. For example, the push-button or pull-tab may be configured for moving the first spindle into the second position.

The first spindle may be resiliently biased into one of the first position and the second position. For example, the first spindle may be resiliently biased into the first position.

The follower may comprise a square aperture, and the first spindle may comprise a corresponding square cross-section, such that the first spindle is able to drive rotation of the follower (when in the first position). The square cross-section may be disengaged from the follower when the first spindle is in the second position.

The follower may be part of a lock mechanism configured to operate a bolt of the lock. The follower may be operable to move the bolt between an extended position and a retracted position. For example, the follower may be operable to selectively retain the bolt in a retracted position. The bolt may be resiliently biased into an extended position. The follower may be rotatable between a first rotational position in which the follower is disengaged from the bolt and the bolt is resiliently biased into an extended position (e.g. locked configuration); and a second rotational position in which the follower engages the bolt and retains the bolt in a retracted position (e.g. unlocked configuration).

The lock may further comprise a second spindle extending from a second side of the lock; wherein the second spindle is rotationally coupled with the follower. The second spindle may be for attachment to a second handle on the second side of the lock, such that rotation of the follower can be operated by a second user via the second spindle. The second spindle may also comprise a square cross-section rotationally engaged with the square aperture of the follower.

The second spindle may be configured to be rotatable relative to the first spindle (for example rotatable relative to the first spindle when the first spindle is in the second position). The second spindle may be rotationally coupled with the follower when the first spindle is in each of the first and second positions.

The second spindle may be translationally coupled with the first spindle, such that translation of the second spindle relative to the follower causes (e.g. drives) translation of the first spindle relative to the follower. Translation of the second spindle (and by extension the first spindle) may be operable from the second side of the lock, for example via a button or pull-tab associated with the handle.

The translational travel of the second spindle may be limited so as to prevent rotational disengagement of the second spindle from the follower.

The first spindle may be resiliently biased into one of the first position and the second position. For example, the first spindle may be resiliently biased into the first position. The resilient biasing may be provided by a spring, for example a helical spring or a leaf spring.

The lock may comprise a first handle rotationally coupled to the first spindle on the first side of the lock. The lock may also comprise a second handle rotationally coupled to the second spindle on the second side of the lock.

The first handle may have a rotational range of motion that is less than that of the follower. That is, the rotational travel of the first handle may be limited to less than that of the follower. For example, the first handle may comprise at least one detent (e.g. at least one concealed detent) which restricts the rotational travel of the first handle such that it's less than that of the follower. In some examples, the rotational travel of the follower may be relatively unrestricted. In some examples, the rotational travel of the first handle may be at least 5 degrees less than the rotational travel of the follower. This may further help to prevent the user of the first handle from jamming the lock, by ensuring that the first handle can't be used to apply a torsional force on the first spindle which could prevent translational motion of the first spindle.

The first and second spindles may be translatable relative to the first and second handles. The second handle may comprise the push-button or pull-tab.

The first and second spindles may collectively form a split spindle. A split spindle may comprise a first spindle portion at a first end thereof and a second spindle portion at a second end thereof, wherein the first and second spindle portions are rotatable relative to one another. As the reader will understand, the first spindle portion may correspond with (and be functionally equivalent to) the first spindle as described above. Similarly, the second spindle may correspond with (and be functionally equivalent to) the second spindle as described above. The first spindle portion may be coupled to the second spindle portion via corresponding threads. Alternatively, one of the first spindle and the second spindle may comprise a cylindrical cavity for rotational engagement with a corresponding cylindrical protrusion of the other of the first spindle and the second spindle.

For example, the lock of the second aspect may comprise:

a follower; and a split spindle comprising a first spindle portion extending from a first side of the lock and a second spindle portion extending from a second side of the lock;

wherein the split spindle is translatable relative to the follower between a first position in which the first spindle portion is rotationally coupled with the follower; and a second position in which the first spindle portion is rotationally decoupled from the follower. The second spindle portion may be rotationally coupled with the follower in both the first position and the second position.

The first and second aspects may be combined. Further, the optional features of the first aspect may be combined with the second aspect, and vice versa. The first spindle and/or second spindle may extend through the follower in a direction perpendicular to the first plane.

For example, in a third aspect, there is provided a lock for installation in a door leaf defining a first plane, the lock comprising:

a housing; and a bolt moveable relative to the housing between a retracted position, and an extended position in which a distal portion of the bolt protrudes from an opening in the housing;

wherein the distal portion of the bolt comprises at least one shoulder sloped in a plane parallel to the first plane, such that the bolt is moveable into the retracted position in response to a force applied to the shoulder;

the lock further comprising a lock mechanism operable to selectively retain the bolt in the retracted position, the lock mechanism comprising:

follower configured to operate the bolt, and a first spindle extending from a first side of the lock;

wherein the first spindle is translatable relative to the follower between a first position in which the first spindle is rotationally coupled with the follower; and a second position in which the first spindle is rotationally decoupled from the follower.

Any of the optional features as described above may be combined with the third aspect. The first spindle may extend through the follower in a direction perpendicular to the first plane.

BRIEF DESCRIPTION OF THE DRAWINGS

Specific examples of the present disclosure will now be set out, with reference to the accompanying drawings, in which.

Figure 1A:
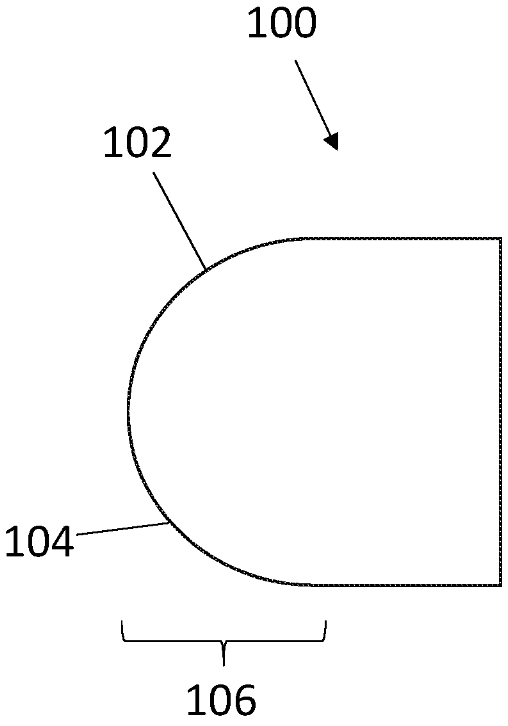
FIGS. 1*a*-1*d* respectively show a first, a second, a third and a fourth bolt according to the present disclosure.

Like references are used for like features in the drawings.

DETAILED DESCRIPTION

FIGS. 1*a*-1*d* show a number of bolt configurations for use with a lock according to the present disclosure. Also shown for FIGS. 1*a*-1*d* are a first direction H, and a second direction V. For illustrative purposes, the first direction H will be described below as the horizontal direction, and the second direction V will be described below as the vertical direction. In other words, the description below is orientation-specific, in the interest of providing a clear description of a working example of the lock according to the present disclosure. However, as the reader will appreciate, the lock according to the present disclosure could in practice be used in any orientation other than that described below.

FIG. 1*a* shows a bolt 100 according to a first example of the present disclosure. The bolt 100 is configured for movement relative to a housing (not shown in FIG. 1) in the horizontal direction H. The distal end 106 of the bolt 100 is rounded to form a sloped upper shoulder 102, and a sloped lower shoulder 104. The distal portion 106 comprising the sloped shoulders 102, 104 is the portion of the bolt that protrudes from the housing when the bolt is in the extended (locked) position (c.f. FIG. 2 below). Each sloped shoulder forms an oblique angle with each of the vertical direction V and the horizontal direction H. Each shoulder is parallel with the plane of the page in FIG. 1*a* (which is parallel with the first plane of the first aspect described above).

Figure 1B:
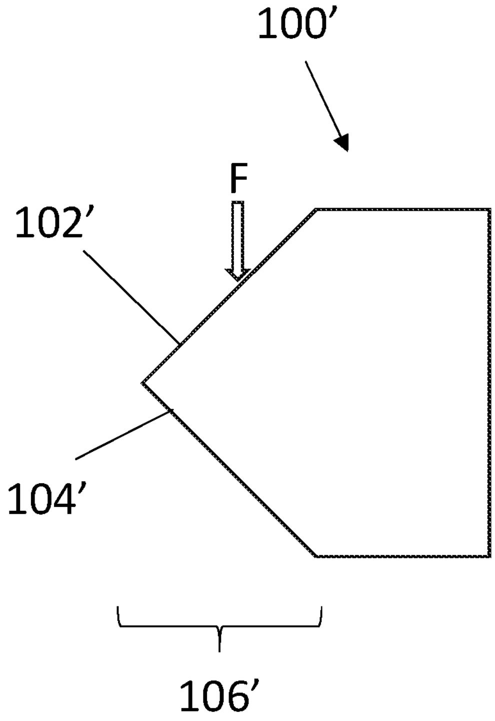
Figure 2:
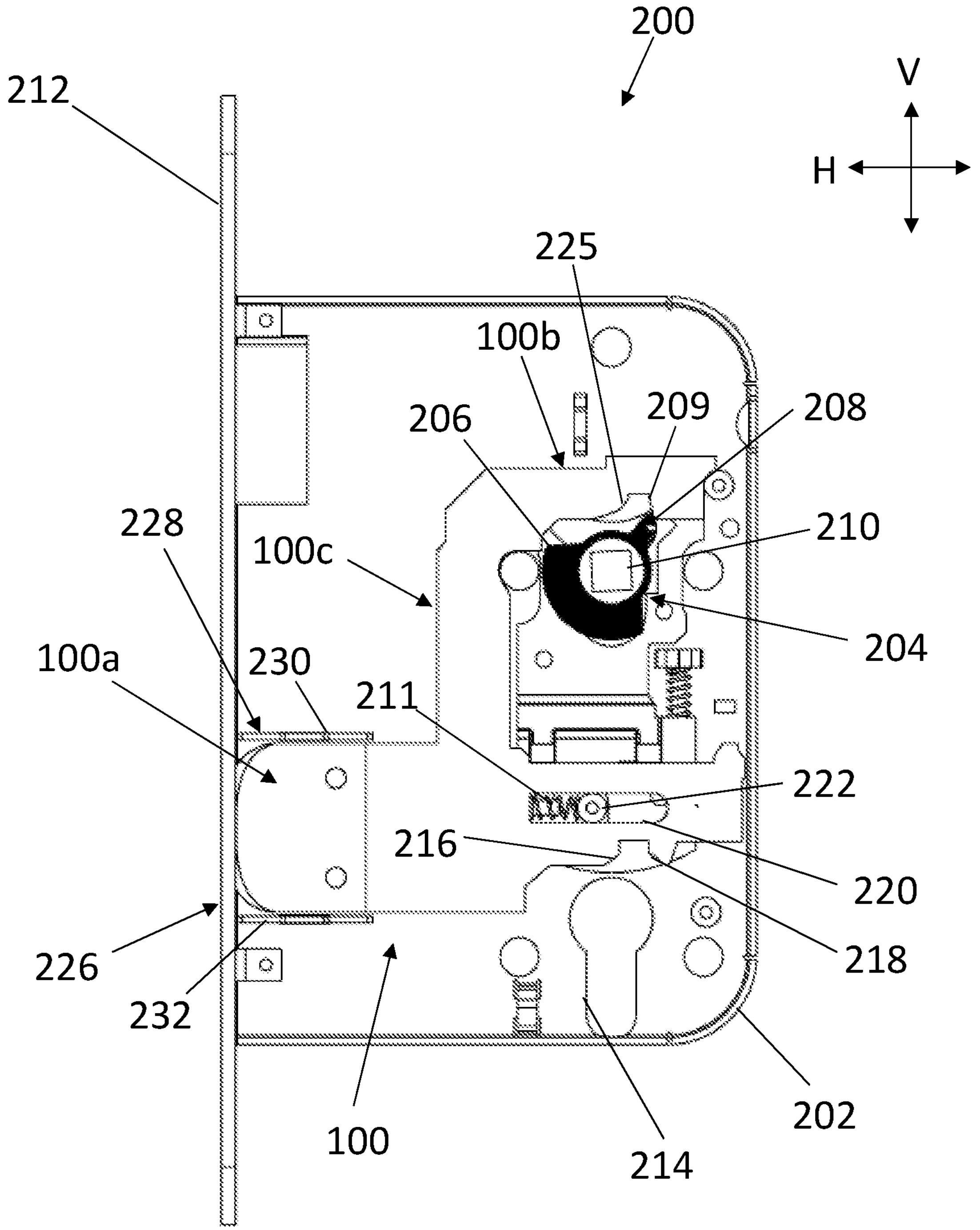
FIG. 2 shows a lock according to the present disclosure in an unlocked configuration.

FIG. 1*b* shows a bolt 100' according to a second example. As with the bolt 100, the bolt 100' has a distal portion 106' which includes a sloped upper shoulder 102' and a sloped lower shoulder 104'. Again, each of the sloped shoulders 102', 104' forms an oblique angle with each of the horizontal direction H and the vertical direction V.

Shown in FIG. 1*b* is a force F applied in a vertical (downwards) direction V to the upper sloped shoulder 102' of the bolt 100'. Because of the slope of the shoulder 102', where the bolt is constrained to move in the horizontal direction, the resultant force on the bolt 100' includes a horizontal component and a vertical component. Therefore, where the bolt 100' is constrained to move only in the horizontal direction, the force F will cause the bolt to move (retract) in the horizontal direction. As the reader will understand, the same principle applies to FIGS. 1*a*, 1*c*, 1*d*.

Figure 1C:
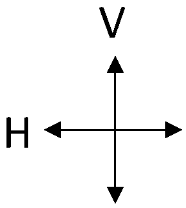
Figure 1C:
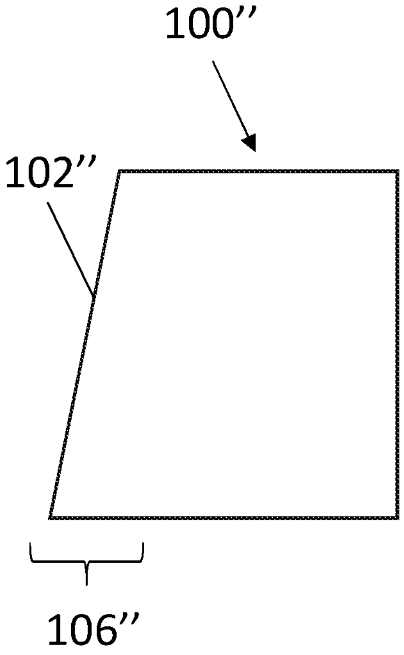

FIG. 1*c* shows a bolt 100" according to a third example. The bolt 100" also has a distal portion 106". However, whereas the bolts 100 and 100' include both a sloped upper shoulder and a sloped lower shoulder, the bolt 100" includes only an upper sloped shoulder 102". When a vertical (downwards) force F is applied to the upper sloped shoulder 102", the bolt 100" will similarly be caused to move in the horizontal direction.

Figure 1D:
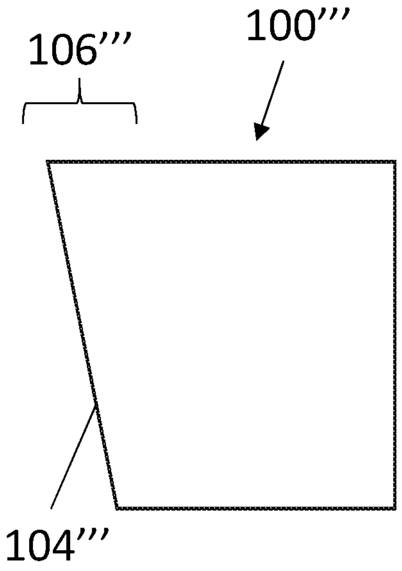

FIG. 1*d* shows a bolt 100' according to a fourth example. The bolt 100'" is similar to the bolt 100" above, save for the fact that its distal portion 106'" includes a sloped lower shoulder 104', rather than a sloped upper shoulder 102".

FIG. 2 shows a lock 200 according to the present disclosure. The lock 200 includes a bolt 100 according to FIG. 1*a*. However, as the reader will understand, the lock may alternatively include a bolt according to FIG. 1*b*, 1*c*, or 1*d*. Repeated again on FIG. 2 for illustrative purposes are the horizontal direction H, and the vertical direction V.

The lock 200 comprises a housing 202, which in the unlocked configuration shown in FIG. 2 fully conceals the bolt 100. The bolt 100 is operated via a locking mechanism 204 which includes a follower 206 and a spindle (not shown in FIG. 2). The follower 206 includes a cam 208 configured to engage a proximal end of the bolt 100 to thereby operate movement of the bolt 100 relative to the housing 202. As can be seen, the follower comprises a square aperture 210 for receiving a square spindle.

Figure 4:
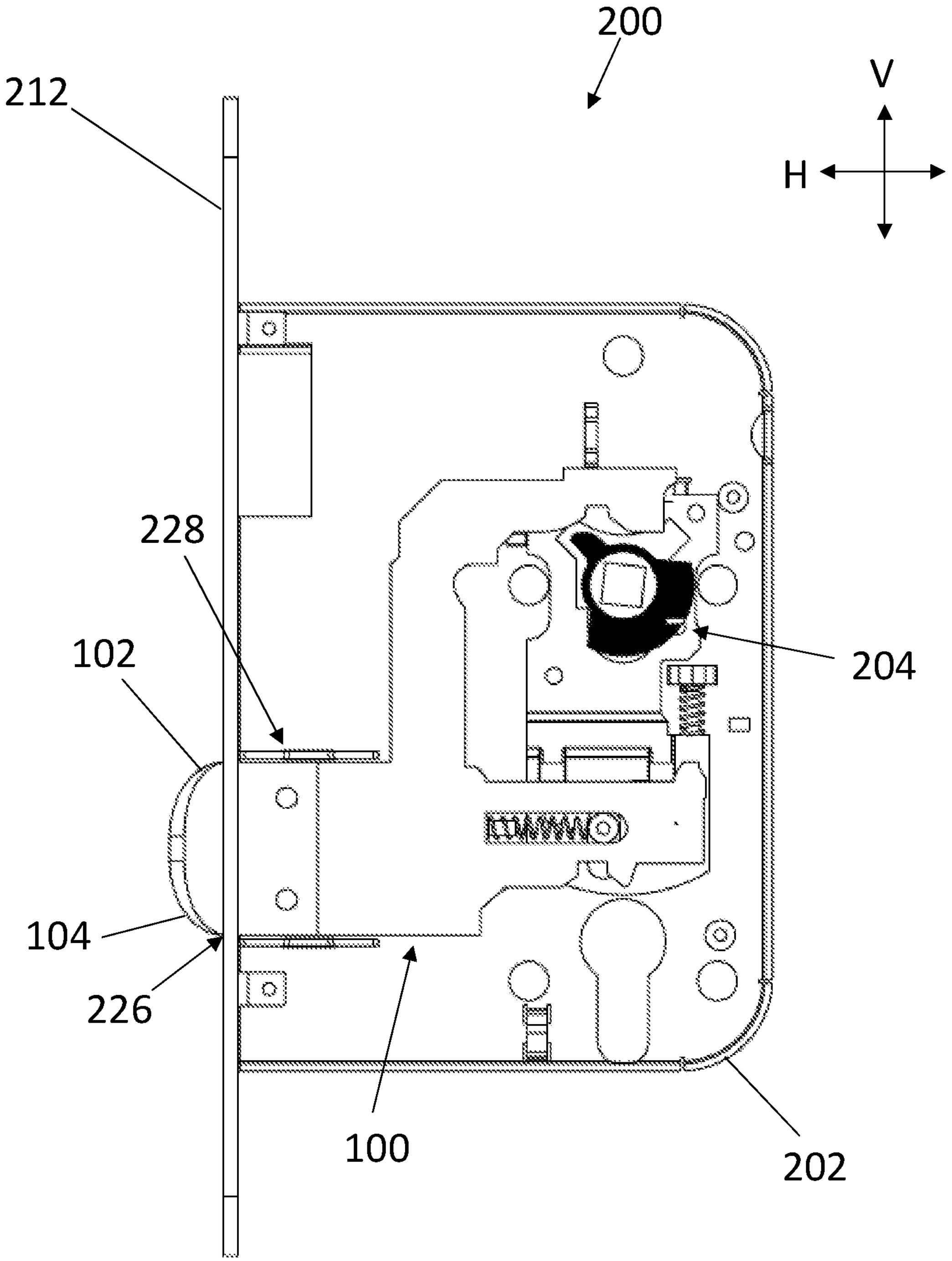
FIG. 4 shows the lock of FIGS. 2 and 3 in a locked configuration.

The lock 200 also includes a helical spring 211 coupled to the housing and to the bolt 100 so as to resiliently bias the bolt 100 into an extended position as shown in FIG. 4.

Face plate 212 of the housing 200 is configured in use to sit flush with an edge of a door leaf into which the lock 200 is installed. When installed, the rest of the housing 202 is concealed within the door leaf. For the purposes of the present disclosure, the plane which is parallel to the page in FIG. 2 corresponds to the first plane as described in the first aspect.

As the reader will understand, the bolt 100 may additionally be operated by an off-the-shelf cylinder lock (not shown). The off-the-shelf cylinder lock may be accessible via opening 214 in the housing 202, and may actuate the bolt 100 via engagement surfaces 216, 218.

The bolt 100 comprises an elongate channel 220 proximal of the distal portion 106. A pin 222 coupled to the casing 202 is located within the elongate channel 220, to thereby restrict the motion of the bolt 100 to the horizontal direction H. The helical spring 211 is secured at a first end thereof to the pin 222, and at a second end thereof to a distal end of the channel 220. Accordingly, the bolt 100 is restricted to movement in the horizontal direction between a retracted position (shown in FIG. 2) and an extended position (shown in FIG. 4). The helical spring 211 resiliently biases the bolt into the extended position.

As can also be seen from FIG. 2, the locking mechanism 204 is vertically offset from the elongate channel 220. This is achieved by having a main bolt portion 100*a*, and an offset bolt portion 100*b*. The offset bolt portion 100*b* is vertically offset from the main bolt portion 100*a* and is attached to the main bolt portion 100*a* by a connecting portion 100*c*. The locking mechanism 204 is positioned adjacent the offset bolt portion 100*b* in order to operate the bolt 100 via the offset bolt portion 100*b*.

Also shown in FIG. 2 is a shroud 228. The shroud 228 comprises a first plate 230 and a second plate 332. The first plate 230 is located within the housing 202 and extends adjacent the upper edge of the bolt 100. The second plate 232 is located within the housing 202 and extends adjacent the lower edge of the bolt 100. The shroud 228 abuts the opening 226 from the inner side of the housing 202. Accordingly, even though a small gap exists between the bolt 100 and the housing 202 when the bolt is in the retracted position of FIG. 2, the shroud 228 prevents access to the interior of the housing 202.

FIG. 2 shows the lock 200 in an unlocked configuration. In this configuration, the follower 206 of the locking mechanism 204 is in a second rotational position in which the cam 208 engages a proximal surface 209 of the bolt 100 so as to retain the bolt 100 in the retracted position as shown in FIG. 2. This corresponds to an unlocked configuration of the lock mechanism. In the retracted position, the bolt is fully concealed within the housing 202. In particular, the distal portion 106 of the bolt 100 does not protrude through the opening 226. The cam 208 overcomes the biasing force of the helical spring 211 to retain the bolt 100 in the retracted position. A detent 224 restricts the proximal motion of the bolt 100 so that it cannot extend any further proximally than the retracted position shown in FIG. 2.

In order to move the lock into a locked configuration, a user operates the lock mechanism 204. In particular, the user operates the lock mechanism 204 in order to rotate the follower 206 away from the first rotational position of FIG. 2, and into the first rotational position of FIG. 4, via the intermediate rotational position of FIG. 3. As the follower 206 rotates, the cam 208 moves in the generally distal direction, and the bolt 100 in turn also moves in the distal direction under the biasing influence of the helical spring 211.

Figure 3:
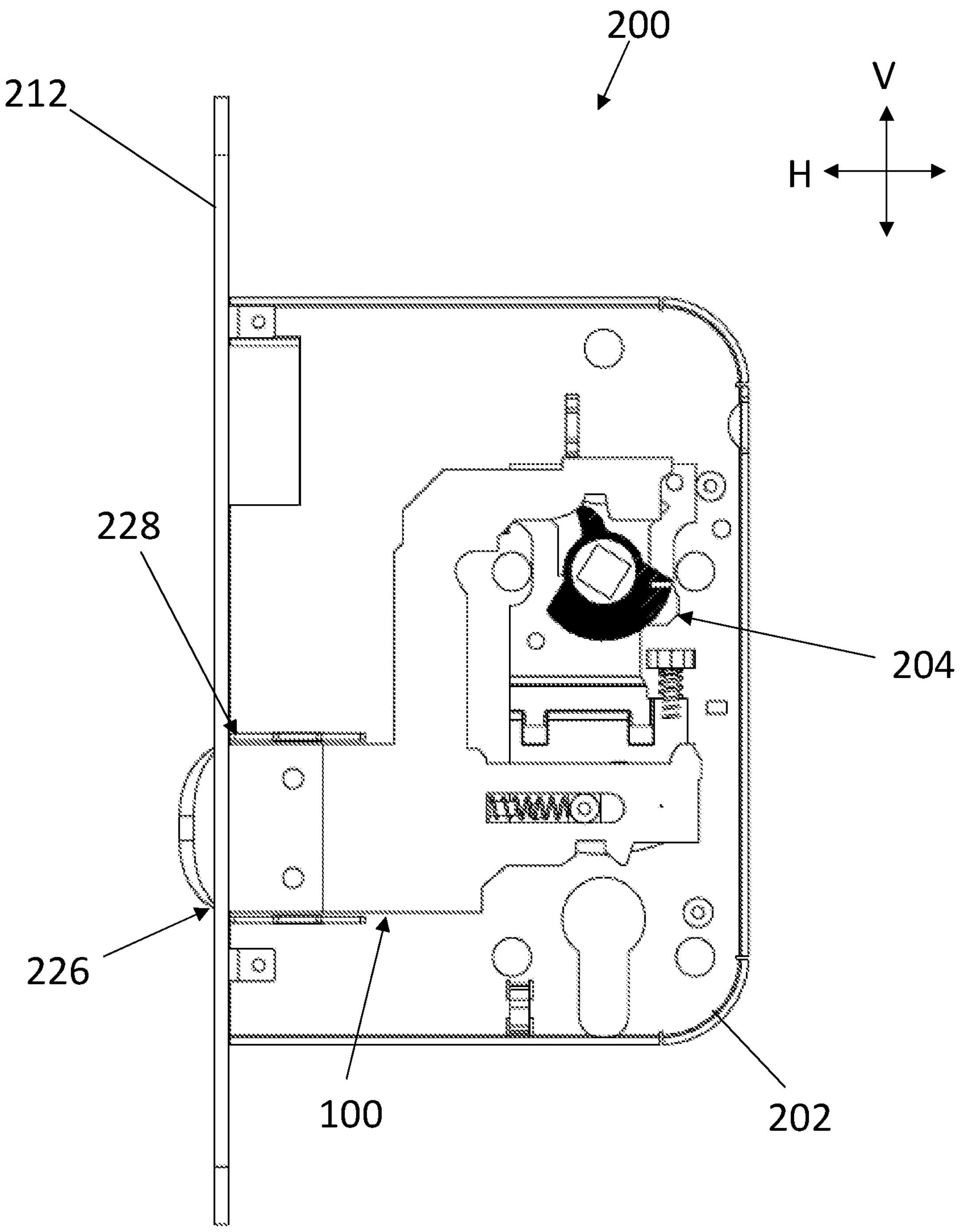
FIG. 3 shows the lock of FIG. 2, with the bolt in an intermediate configuration.

Rotation of the follower 206 continues, until the follower 206 reaches the second rotational position shown in FIG. 4. In this second rotational position, the follower 206 has rotated sufficiently for the cam 208 to completely disengage from the bolt 100, such that the bolt 100 can freely move under the influence of the helical spring 211, without the cam 208 obstructing the horizontal movement of the bolt 100. As shown in FIGS. 2, 3 and 4, the proximal surface of the cam 208 is rounded so as to ensure that the cam does not interfere with the movement of the bolt 100 when the follower is in the second rotational position. An adjacent distal surface 225 of the bolt 100 is similarly rounded to prevent it from snagging on the cam 208 when the follower is in the second rotational position.

The helical spring 211 retains the bolt 100 in the extended position shown in FIG. 4. This is the locked configuration of the lock 100.

In the locked configuration, the bolt 100 can be moved back into the retracted (unlocked) position either by applying a force to the distal end of the bolt 100, or by a user moving the follower 206 back to the first rotational position of FIG. 2, such that the cam 208 once again engages the proximal surface 209 to retain the bolt 100 in the retracted position of FIG. 2.

As can be seen from FIG. 4, in the locked configuration in which the bolt 100 is in the extended position, the distal portion 106 of the bolt 100 having the sloped upper and lower surfaces 102, 104 protrudes from the opening 226 in the housing 202. If a force is applied in the upwards direction or the downwards direction to the distal portion 106 of the bolt 100, the sloped surfaces will cause the bolt 100 to retract back into the housing 202. Accordingly, as soon as an individual tries to suspend a weight from a ligature anchored around the bolt 100, the bolt 100 will move back into the retracted position shown in FIG. 2, such that the anchor point is immediately removed. Once the force is removed, the bolt 100 will once again return to the extended position of FIG. 4 under the influence of the helical spring 211.

Figures 5, 10:
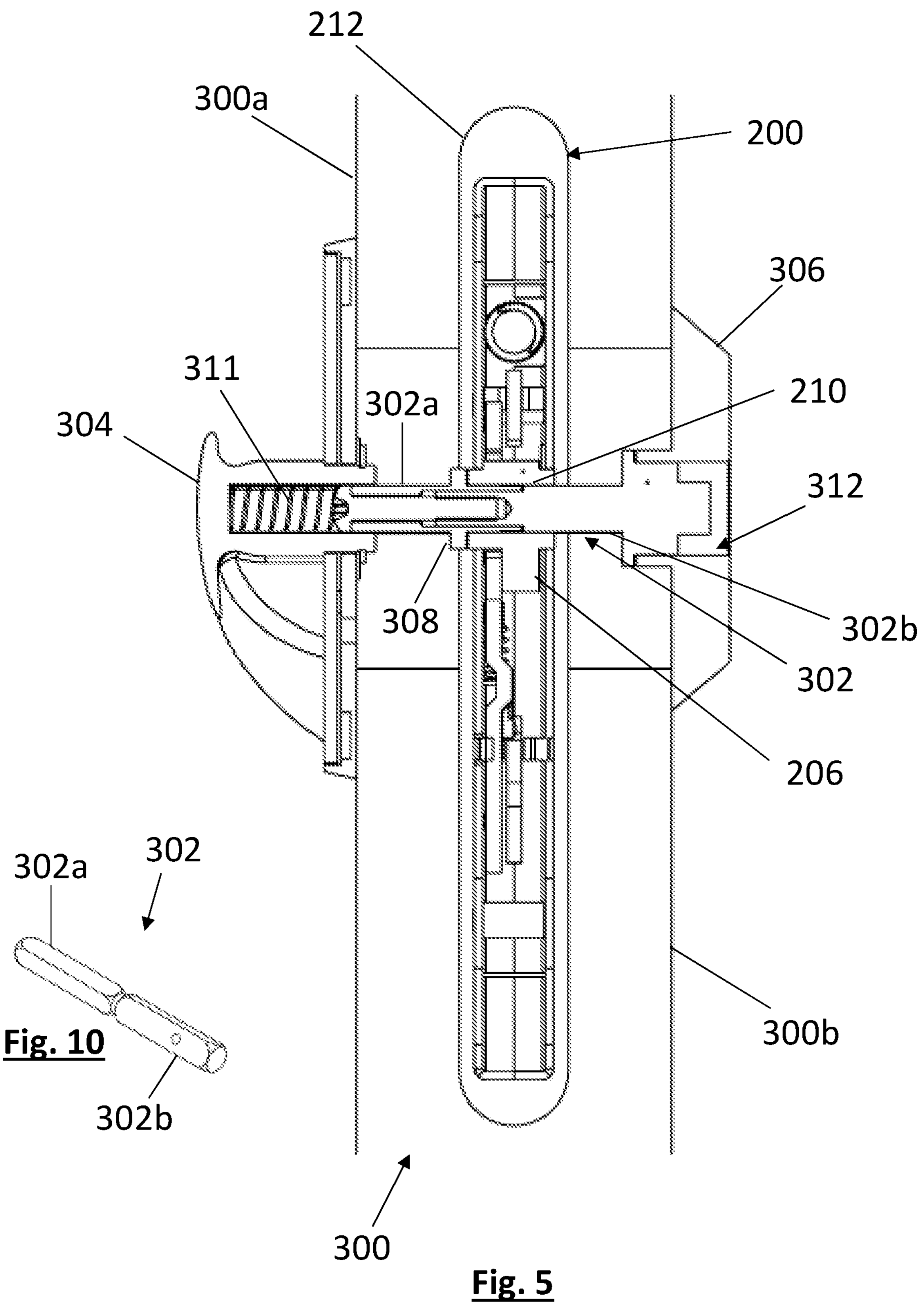
FIG. 5 shows a perpendicular cross-section of the lock in FIGS. 2-4, with a spindle shown in a first position.
FIG. 10 shows a split spindle for use with a lock according to the present disclosure.

FIG. 5 shows a perpendicular cross-section of the lock 200 from FIGS. 2-4. The cross-sectional view of FIG. 5 is taken along a horizontal plane that extends into the page in FIGS. 2-4, i.e. a horizontal cross-section taken through the door leaf 300 into which the lock 200 is installed.

FIG. 5 shows the door lock 200 installed in a door leaf 300. The face plate 212 sits flush with a front edge of the door leaf 300. A split spindle 302 extends through the follower 206. The split spindle 302 has a square cross-section, for rotational engagement with the square aperture 210 of the follower 206. Accordingly, the split spindle 302 is operable to drive rotation of the follower 206 between the first rotational position (FIG. 2) and the second rotational position (FIG. 4)—i.e. is operable to lock or unlock the door. Moreover, a first end of the split spindle 302 is connected to a first handle 304, and a second end of the split spindle 302 is connected to a second handle 306. Accordingly, a user can operate the lock 200 from the first side 300*a* of the door (using the first handle 304), or from the second side 300*b* of the door (using the second handle 306).

The split spindle 302 includes a first spindle portion 302*a*, and a second spindle portion 302*b*. The first spindle portion 302*a* is rotationally coupled with the first handle 304; and the second spindle portion 302*b* is rotationally coupled with the second handle 306. The first portion 302*a* of the split spindle is attached to the second portion 302*b* of the split spindle by a threaded connection. Accordingly, the first and second portions 302*a*, 302*b* are translationally coupled with one another, but are able to rotate relative to one another. An illustration of such a split spindle 302 having a first spindle portion 302*a* and a second spindle portion 302*b* is shown in FIG. 10.

Figure 6:
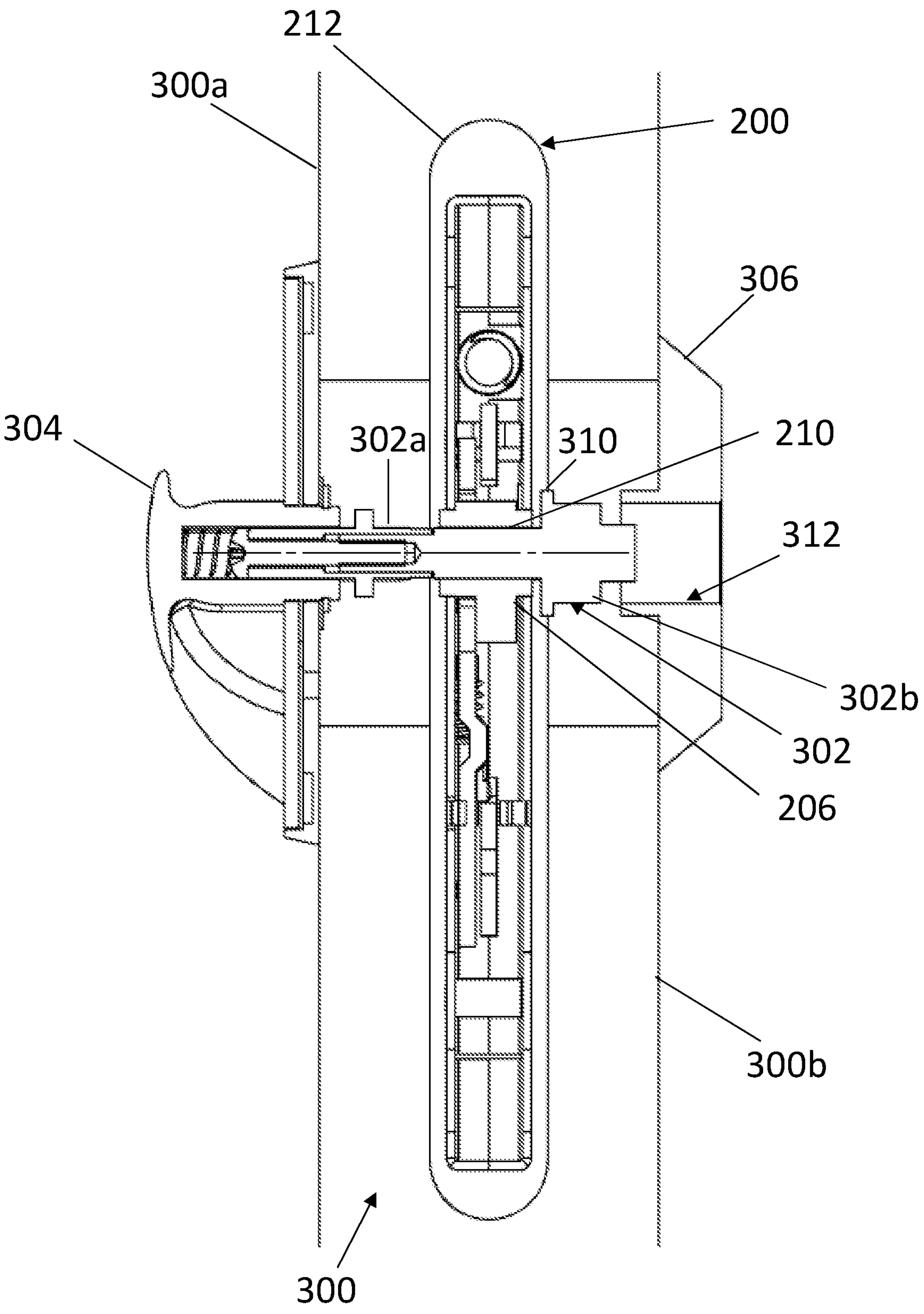
FIG. 6 shows the perpendicular cross-section of FIG. 5, with the spindle shown in a second position.

With continued reference to FIG. 5, the split spindle 302 is translatable relative to the follower 206, and relative to the first and second handles 304, 306. That is, the split spindle 302 is translatable between a first position as shown in FIG. 5; and a second position as shown in FIG. 6. A first lip 308 on the first spindle portion 302*a* and a second lip 310 on the second spindle portion 302*b* limit the translational movement of the split spindle 302 to being between the first position and the second position. A helical spring 311 resiliently biases the split spindle 302 into the first position as shown in FIG. 5. The second handle 306 includes an opening 312. A user on the second side 300*b* of the door can push the second portion 302*b* of the spindle via the opening 312, to thereby move the split spindle 302 into the second position shown in FIG. 6. When the user releases the second portion 302*b* of the spindle, it will then return to the first position as shown in FIG. 5 under the biasing influence of the helical spring 311. The helical spring 311 is located within the first handle 304, and is coupled to the first portion 302*a* of the split spindle so as to bias the split spindle 302 into the first position.

When the split spindle 302 is in the first position as shown in FIG. 5, i.e. when a user on the second side 300*b* of the door leaf 300 is not pressing on the second portion 302*b* of the split spindle, both the first portion 302*a* and the second portion 302*b* of the split spindle are located within the follower 306. Accordingly, both are rotationally coupled with the follower. By extension, when the split spindle is in the first position as shown in FIG. 5, both the first handle 304 and the second handle 306 are rotationally coupled with the follower. The lock can therefore be operated via both the first handle 304 and the second handle 306.

If a user on the first side of the door 300*a* holds the handle 304 so as to prevent it from rotating, the first portion of the spindle 302*a*— which is located within the follower 304 and thus rotationally coupled with the follower 304 when the split spindle 302 is in the first position of FIG. 2—will prevent unlocking of the door. However, a user on the second side of the door can override the first handle 304 by pushing the split spindle 302 into the second translational position of FIG. 6 via the opening 312. When the split spindle 302 is in the second translational position shown in FIG. 6, the first portion 302*a* of the split spindle is no longer located within the follower 206. Accordingly, the first portion 302*a* of the split spindle—and by extension the first handle 304—are no longer rotationally coupled with the follower 306. Accordingly, the user of the second handle 306 can override/disengage the first handle to unlock the door. A key may be provided for insertion into the opening 312 to enable easy override.

Figure 7:
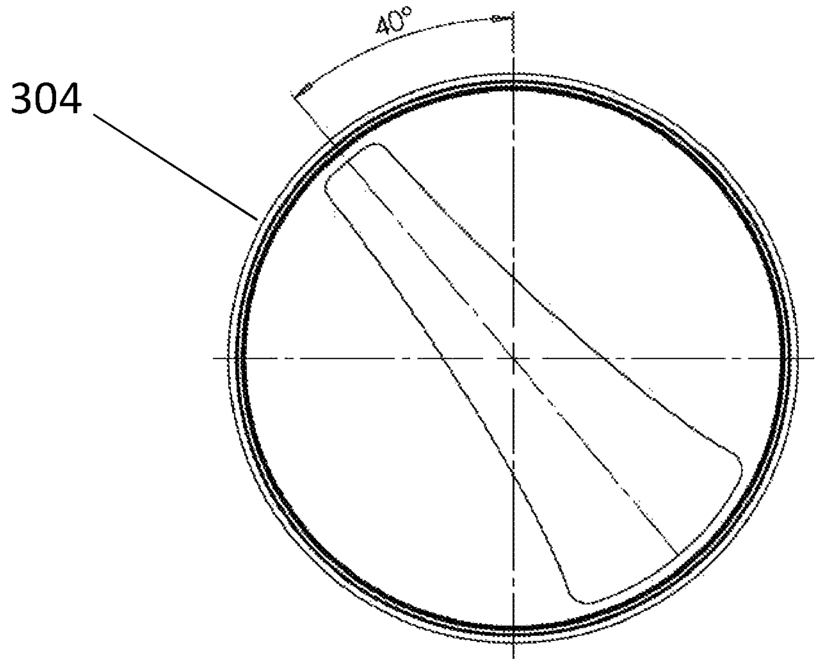
FIG. 7 shows a front side of a handle for use in the lock of FIGS. 2-6.
Figure 8:
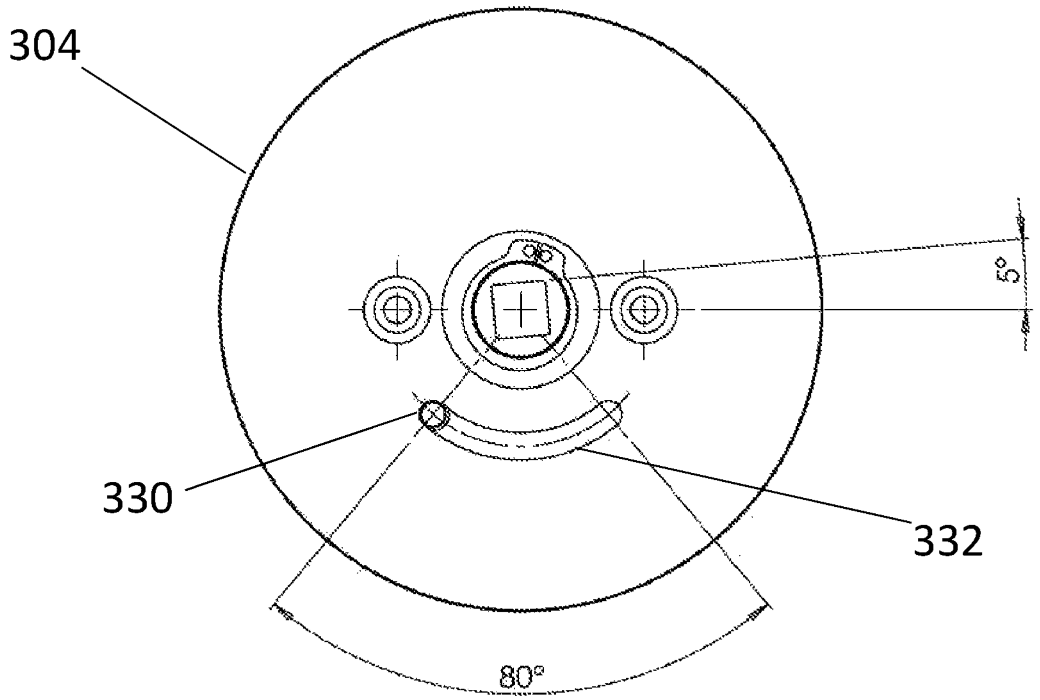
FIG. 8 shows a rear side of the handle of FIG. 7.

FIG. 7 shows an example of the first handle 304. As illustrated, the handle 304 is configured to rotate by 40 degrees in a first direction, and by 40 decrees in a second direction. Accordingly, the total rotational travel of the handle is limited to 80 degrees. FIG. 8 shows the reverse side of the handle 304 (the part which is concealed within use). A protrusion 330 and a corresponding arcuate channel 332 are shown. The protrusion 330 is attached to the door leaf 300 and extends into the channel 332 of the handle 304, in order to restrict the rotational travel of the handle 304 to 80 degrees as discussed above. The follower 206 is free to rotate by more than 80 degrees. Accordingly, a user of the handle 304 is not able to apply a torsional strain between the spindle 302 and follower 206. The user therefore is not able to seize the spindle 302 within the follower 206 to prevent translational movement of the spindle 302 relative to the follower 206. The follower 206 may be configured to have a rotational travel of at least 90 degrees, i.e. at least 5 degrees greater than that of the handle 304 in each direction.

Above, a lock 200 which combines the retracting bolt of the first aspect, and the translatable spindle of the second aspect, has been described. However, as the reader will understand, the lock mechanism (comprising the follower and the translatable split spindle) as described in detail in FIGS. 5-6 could be used with a conventional, off-the-shelf bolt. Similarly, the retracting lock arrangement described in detail in FIGS. 2-4 could be used with a conventional, off-the-shelf lock mechanism. Advantages are achieved by each of the first and second aspects of the present disclosure when considered alone. Additionally, the combination of the two aspects provides a synergistic lock system with even higher levels of user safety.

Figure 9:
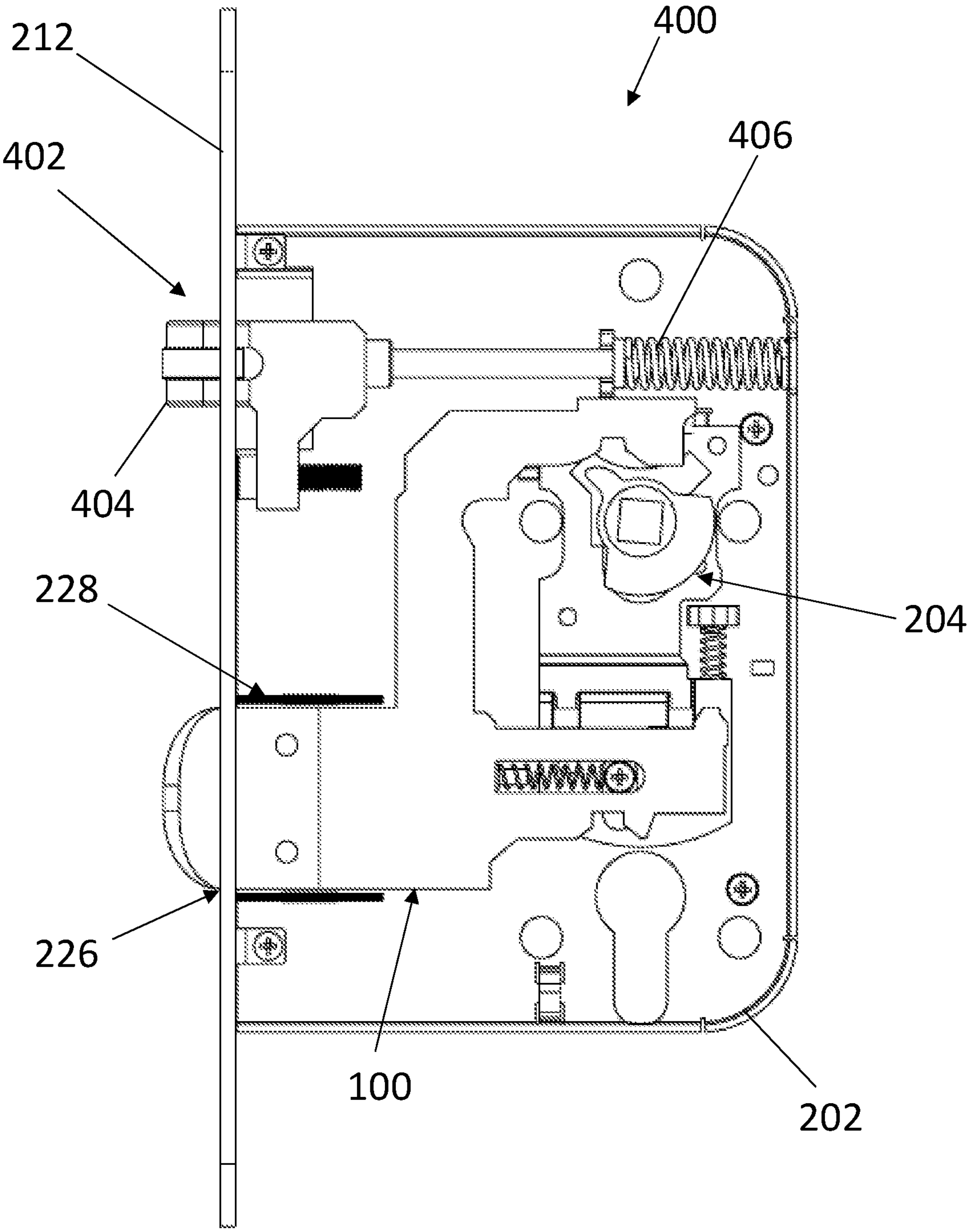
FIG. 9 shows a lock according to a further example of the present disclosure.

FIG. 9 shows a lock 400 according to a further example, in a locked configuration. The lock 400 includes all of the features of the lock 200 described above. Like reference numerals are therefore used for like features/components. However, the lock 400 includes an additional feature. In particular, the lock 400 includes a roller latch 402. The roller latch 402 includes a roller 404 and a helical spring 404 arranged to bias the roller 404 into the extended position shown in FIG. 9.

It is to be understood that the above description is intended to be illustrative, and not restrictive. Many other implementations will be apparent to those of skill in the art upon reading and understanding the above description. Although the present disclosure has been described with reference to a specific example implementation, it will be recognized that the disclosure is not limited to the implementations described, but can be practiced with modification and alteration insofar as such modification(s) and alteration(s) remain within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A lock for installation in a door leaf defining a first plane, the lock comprising:

a housing;

a bolt moveable relative to the housing between a retracted position, and an extended position in which a distal portion of the bolt protrudes from an opening in the housing, wherein the bolt is resiliently biased into the extended position; and a lock mechanism configured to selectively engage the bolt in order to selectively retain the bolt in the retracted position;

wherein the distal portion of the bolt comprises a sloped upper shoulder and a sloped lower shoulder, such that the bolt is moveable into the retracted position in response to a force applied in a vertical direction with respect to the first plane to at least one shoulder;

wherein the lock mechanism comprises a follower and a cam, wherein the follower is configured to rotate the cam, and wherein the cam is configured to selectively engage a corresponding surface of the bolt;

wherein the follower is rotatable between:

a first rotational position in which the cam is disengaged from the bolt such that the bolt is resiliently biased into the extended position; and a second rotational position in which the cam engages the corresponding surface of the bolt to retain the bolt in the retracted position;

wherein movement of the follower from the first rotational position to the second rotational position causes the cam to move the bolt into the retracted position.

2. The lock of claim 1 wherein, when the bolt is in the extended position, the slope of each of the upper shoulder and the lower shoulder extends at least to the opening.

3. The lock of claim 1, wherein the distal portion of the bolt is rounded to form the upper shoulder and the lower shoulder.

4. The lock of claim 1, further comprising a shroud arranged within the housing to conceal an interior of the housing when the bolt is in the retracted position.

5. The lock of claim 4, wherein the shroud extends proximally from the opening.

6. The lock of claim 5, wherein the shroud at least partially encases the bolt.

7. The lock of claim 1, wherein the lock mechanism further comprises:

a first spindle extending from a first side of the lock;

wherein the first spindle is translatable relative to the follower between a first position in which the first spindle is rotationally coupled with the follower; and a second position in which the first spindle is rotationally decoupled from the follower.

8. The lock of claim 7, wherein the lock mechanism further comprises:

a second spindle extending from a second side of the lock; wherein the second spindle is rotationally coupled with the follower.

9. The lock of claim 8, wherein the second spindle is configured to be rotatable relative to the first spindle.

10. The lock of claim 8, wherein the second spindle is translationally coupled with the first spindle, such that translation of the second spindle relative to the follower causes the first spindle to translate relative to the follower.

11. The lock of claim 10, wherein the second spindle is rotationally coupled with the follower when the first spindle is in each of the first position and the second position.

12. The lock of claim 8, wherein the first spindle and the second spindle collectively form a split spindle.

13. The lock of claim 8, wherein translational travel of the second spindle is limited so as to prevent rotational disengagement of the second spindle from the follower.

14. The lock of claim 8, wherein the first spindle is coupled with a first handle, and the second spindle is coupled with a second handle.

15. The lock of claim 14, wherein a rotational range of motion of the first handle is less than that of the follower.

16. The lock of claim 7, wherein the first spindle is resiliently biased into one of the first position and the second position.

17. A lock for installation in a door leaf defining a first plane, the lock comprising:

a housing; and a bolt moveable relative to the housing between a retracted position, and an extended position in which a distal portion of the bolt protrudes from an opening in the housing;

wherein the distal portion of the bolt comprises a sloped upper shoulder and a sloped lower shoulder, such that the bolt is moveable into the retracted position in response to a force applied in a vertical direction with respect to the first plane to at least one shoulder.

* * * * *